(12) United States Patent
Karve et al.

(10) Patent No.: US 11,200,048 B2
(45) Date of Patent: Dec. 14, 2021

(54) MODIFICATION OF CODIFIED INFRASTRUCTURE FOR ORCHESTRATION IN A MULTI-CLOUD ENVIRONMENT

(71) Applicant: International Business Machines Corporation, Armonk, NY (US)

(72) Inventors: Alexei Karve, Mohegan Lake, NY (US); Sai Zeng, Yorktown Heights, NY (US); Ting Dai, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/931,785

(22) Filed: May 14, 2020

(65) Prior Publication Data

US 2021/0357206 A1 Nov. 18, 2021

(51) Int. Cl.
*G06F 8/70* (2018.01)
*G06N 20/00* (2019.01)
*G06F 11/36* (2006.01)

(52) U.S. Cl.
CPC .......... *G06F 8/70* (2013.01); *G06F 11/3612* (2013.01); *G06N 20/00* (2019.01)

(58) Field of Classification Search
CPC ........ G06F 8/70; G06F 11/3612; G06N 20/00
USPC .................................................. 717/124–167
See application file for complete search history.

(56) References Cited

U.S. PATENT DOCUMENTS

| | | | | |
|---|---|---|---|---|
| 6,091,897 A * | 7/2000 | Yates | ................... | G06F 9/45516 717/138 |
| 6,282,702 B1 * | 8/2001 | Ungar | ................. | G06F 9/45504 717/148 |
| 7,490,319 B2 | 2/2009 | Blackwell et al. | | |
| 8,713,532 B2 * | 4/2014 | Gogh | .................. | G06F 11/3664 717/125 |
| 9,038,030 B2 | 5/2015 | Rama et al. | | |
| 9,921,948 B2 * | 3/2018 | Zieder | ...................... | G06F 8/20 |

(Continued)

FOREIGN PATENT DOCUMENTS

| | | |
|---|---|---|
| CN | 108932192 | 12/2018 |
| CN | 110580170 A | 12/2019 |

OTHER PUBLICATIONS

Arvaree, Thamilvaani, and Rodziah Atan. "Algorithm analyzer to check the efficiency of codes." ICIMU 2011: Proceedings of the 5th international Conference on Information Technology & Multimedia. IEEE, 2011.pp. 1-7 (Year: 2011).*

(Continued)

*Primary Examiner* — Satish Rampuria
(74) *Attorney, Agent, or Firm* — Lieberman & Brandsdorfer, LLC

(57) ABSTRACT

A system, computer program product, and method are provided for supporting risk evaluation and modification of an executable codified infrastructure. The codified infrastructure is analyzed to identify any non-native program instructions. A selection of the identified non-native program instructions are combined and subjected to a risk evaluation by non-native tools. A risk evaluation result is mapped to corresponding lines of the source code, and a risk identifier is assigned to the corresponding lines of the source code. One or more modifications are selectively applied to the codified infrastructure in correspondence with the assigned risk identifier. The applied modification mitigates any defects in the source code.

20 Claims, 8 Drawing Sheets

(56) References Cited

U.S. PATENT DOCUMENTS

| | | | |
|---|---|---|---|
| 2009/0204946 A1* | 8/2009 | Fienblit | G06F 9/44536 717/124 |
| 2011/0191855 A1 | 8/2011 | De Keukelaere | |
| 2016/0004626 A1 | 1/2016 | Jain et al. | |
| 2017/0147338 A1 | 5/2017 | Jackson | |
| 2017/0255547 A1 | 9/2017 | Song | |
| 2018/0165069 A1 | 6/2018 | Xie | |
| 2019/0196934 A1 | 6/2019 | Sisman et al. | |
| 2019/0227902 A1 | 7/2019 | Cheng-Xi et al. | |

OTHER PUBLICATIONS

Barabanov, Alexander, Alexey Markov, and Andrei Fadin. "Software Certification Without Source Codes." Open Systems 4 (2011): pp. 38-41. (Year: 2011).*

Jimenez, Ivo, et al. "Popper: making reproducible systems performance evaluation practical." UC Santa Cruz School of Engineering, Technical report UCSC-SOE-16-10 (2016).pp. 1-10 (Year: 2016).*

Ferry, Nicolas, et al. "Managing multi-cloud systems with CloudMF." Proceedings of the Second Nordic Symposium on Cloud Computing & Internet Technologies. 2013.pp. 38-45 (Year: 2013).*

Ferry, Nicolas, et al. "CloudMF: applying MDE to tame the complexity of managing multi-cloud applications." 2014 IEEE/ACM 7th International Conference on Utility and Cloud Computing. IEEE, 2014.pp. 269-277 (Year: 2014).*

Jamshidi, Pooyan, et al. "Cloud migration patterns: a multi-cloud service architecture perspective." Service-Oriented Computing—ICSOC 2014 Workshops. Springer, Cham, 2015.pp. 1-12 (Year: 2015).*

Brigjaj, Juxhin D., "Why is Source Code Disclosure Dangerous?" Acunetix, May 9, 2019.

White Source Software, "Software Composition Analysis: How to Choose the Right Solution", Aug. 1, 2019.

Antinyan, Vard, et al., "Identifying Risk Areas of Software Code in Agile/Lean Software Development: An Industrial Experience Report", CSMR-WCRE, pp. 154-163, 2014.

Hinnefeld, Henry, "Predicting code bug risk with git metadata", The Civis Journal, Civis Analytics, Mar. 28, 2018.

Hinnefeld, J. Henry, "git risk: using git metadata to predict code bug risk", Jan. 22, 2018.

Dewes, Andreas, "Data-driven Code Analysis: Learning from other's mistakes", Apr. 13, 2015.

Ansible Lint, "Rules", Feb. 12, 2019, https://docs.ansible.com/ansible-lint/rules/rules.html#specifying-rules-at-runtime.

Hersher, Rebecca, "Amazon and the $150 Million Typo", Mar. 3, 2017.

Nichols, Shaun "AWS's S3 outage was so bad Amazon couldn't get into its own dashboard to warn the world", The Register, Mar. 1, 2017.

Quora, "The Main Difference Between Junior Programmers And Senior Programmers", Forbes, Dec. 5, 2017.

AWS, "Summary of the Amazon S3 Service Disruption in the Northern Virginia (US-EAST-1) Region", 2017.

Wong, Eric W., "Source Code-Based Risk Analysis", University of Texas at Dallas, 2012.

Kim, S., et al., "Classifying Software Changes: Clean or Buggy?", IEEE Transactions on Software Engineering, vol. 34, Issue 2, pp. 181-196, Mar.-Apr. 2008.

Rosen, C., et al., "Commit Guru: Analytics and Risk Prediction of Software Commits", ESEC/FSE 2015: Proceedings of the 2015 10th Joint Meeting on Foundations of Software Engineering, Aug. 2015.

PCT/CN2021/092758 International Search Report and Written Opinion, dated Aug. 2, 2021.

* cited by examiner

MODIFICATION OF CODIFIED INFRASTRUCTURE FOR ORCHESTRATION IN A MULTI-CLOUD ENVIRONMENT

BACKGROUND

The present embodiment(s) relate to risk evaluation and modification of an executable codified infrastructure, also referred to as a blueprint. More specifically, non-native program instructions are identified and evaluated in source code within the blueprint, with risky native and non-native program instructions subject to selective modification to mitigate any defects in the source code.

A codified infrastructure also referred to herein as a blueprint, is a collection of elements that define an overall landscape of an information project and of associated standard practices. The blueprint represents an architecture of an application or infrastructure, which includes attributes of a machine, the manner in which it is provisioned, and its policy and management settings. For example, the blueprint may be created for provisioning machines in a cloud computing environment in which the blueprint is used to describe a set of inter-related cloud resources and how they are to be configured to support interaction. The blueprint is a declarative representation of a workload that is both human and machine readable. The blueprint describes what resources will be created and corresponding resource properties. Blueprints define one or more resources to create, and define relationships and dependencies between the defined resources. Dependencies can be implicitly inferred in the blueprint or explicitly defined. The dependencies between resources ensure that they are created in the correct order. The blueprint is a re-usable asset configured for repeated use.

The blueprint, however, does not describe how to build, e.g. construct, the architecture, such as the order in which the components are created. An orchestration engine interprets the blueprint, determines dependencies among resources, and instantiates the resources. Based on resource dependencies, the orchestration engine automatically establishes an optimal execution path. Accordingly, the blueprint focuses on declaration of resources to include, and the orchestration engine addresses instantiation of these resources.

SUMMARY

The embodiments include a system, computer program product, and method for risk evaluation and modification of an executable codified infrastructure, wherein non-native program instructions are identified and evaluated in source code within the blueprint, with risky native and non-native program instructions subject to selective modification to mitigate any defects in the source code.

In one aspect, a computer system is provided with a processing unit operatively coupled to a memory, and an artificial intelligence (AI) platform operatively coupled to the processing unit and memory. The AI platform is configured with tools in the form of an identification manager, a risk manager, and a modifier configured with functionality to support risk evaluation and modification of an executable codified infrastructure. The identification manager is configured to receive a codified infrastructure that has one or more sections of source code. The identification manager analyzes the codified infrastructure and identifies non-native program instructions in the source code along with one or more non-native instruction tools to support risk evaluation. The risk manager is operatively coupled to the identification manager, and is configured to combine a selection of the identified non-native program instructions and subject the combined selection to a risk evaluation by the one or more non-native tools. The risk manager receives a result from the risk evaluation and maps the received result to one or more corresponding lines the source code. The risk manager further functions to assign a risk identifier to the corresponding one or more lines of the source code. The modifier is operatively coupled to the risk manager, and is configured to selectively apply one or more modifications to the codified infrastructure in correspondence with the assigned risk identifier. The applied modification mitigates any defects in the source code.

In another aspect, a computer program product is provided to support risk evaluation and modification of an executable codified infrastructure. The computer program product is provided with a computer readable storage device having embodied program code. The program code is executable by the processing unit with functionality to receive a codified infrastructure that has one or more sections of source code. The codified infrastructure is analyzed and non-native program instructions are identified in the source code along with one or more non-native instruction tools to support risk evaluation. The program code combines a selection of the identified non-native program instructions and subjects the combined selection to a risk evaluation by the one or more non-native tools. A result from the risk evaluation is received and the program code maps the received result to one or more corresponding lines the source code. The program code assigns a risk identifier to the corresponding one or more lines of the source code. The program code further selectively applies one or more modifications to the codified infrastructure in correspondence with the assigned risk identifier. The applied modification mitigates any defects in the source code.

In yet another aspect, a method is provided for supporting risk evaluation and modification of an executable codified infrastructure. A codified infrastructure is received that contains one or more sections of source code. The codified infrastructure is analyzed and non-native program instructions are identified in the source code along with one or more non-native instruction tools to support risk evaluation. A selection of the identified non-native program instructions are combined and subjected to a risk evaluation by the one or more non-native tools. A result from the risk evaluation is received and the received result is mapped to one or more corresponding lines the source code. A risk identifier is assigned to the corresponding one or more lines of the source code. One or more modifications are selectively applied to the codified infrastructure in correspondence with the assigned risk identifier. The applied modification mitigates any defects in the source code.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
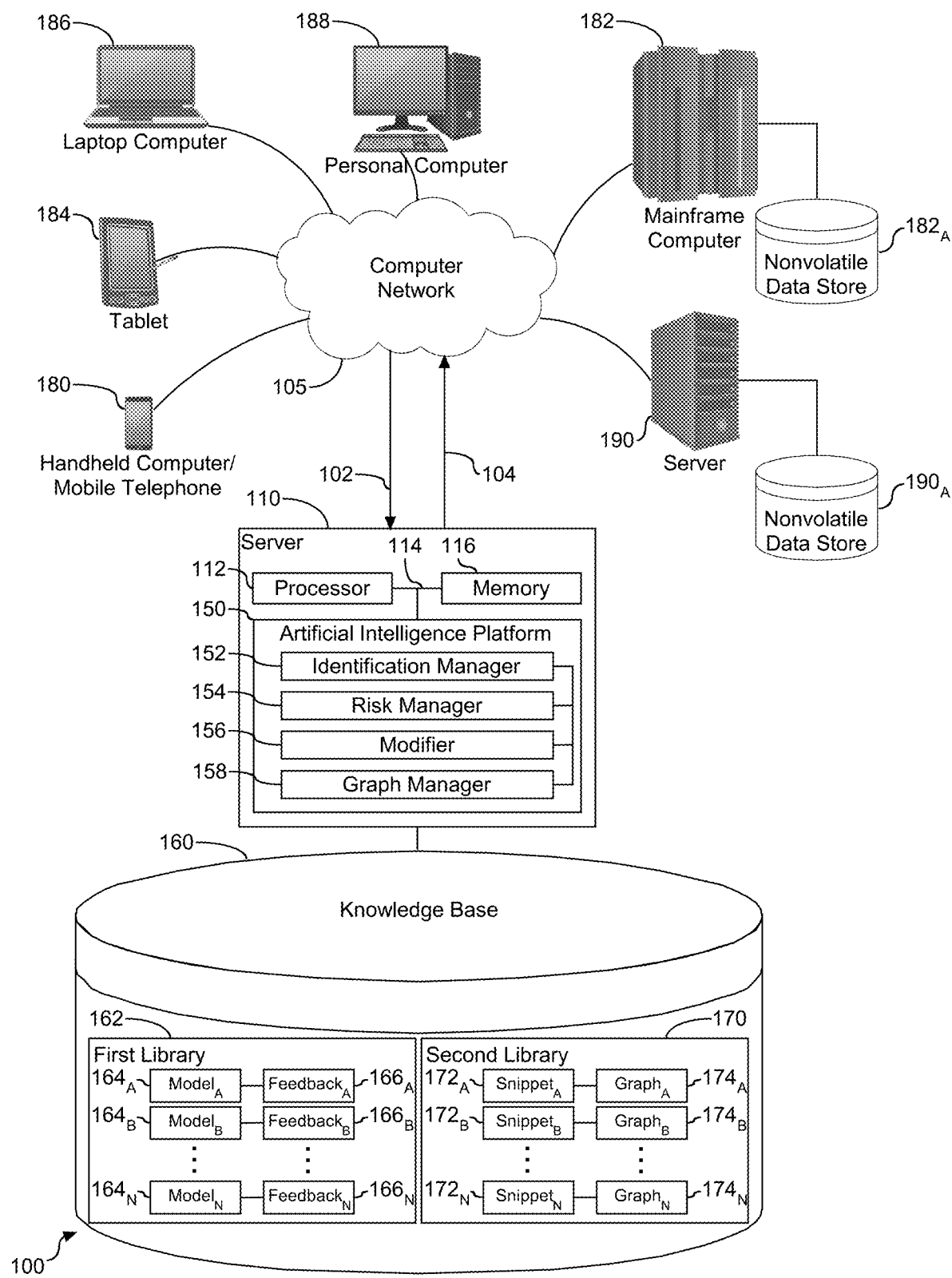
FIG. 1 depicts a system diagram illustrating a schematic diagram of a computer system and embedded tools to support risk evaluation and modification of an executable codified infrastructure.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Modern cloud infrastructure is composed of hundreds or thousands of nodes running in a large-scale and complex fashion. To manage infrastructure at such scale, programmatic automation is extensively used for life-cycle operations, including provisioning and deployment, change management, security and compliance management, event and incident management, etc. Such practices are often referred to as Infrastructure-as-Code (IaC) while the automation procedures are referred to as infrastructure code. Cloud infrastructure code carries out mission critical work. It makes sure infrastructure is managed for availability, security, and resilience, and also guarantees that the running applications on top of the infrastructure are healthy with desirable performance. IaC platforms support scripting languages to interact with the operating systems, cloud infrastructures, and applications in their automation procedures. Scripts are also commonly used to tie together different DevOps tools in infrastructure life-cycle operations. Risky patterns in infrastructure code and scripts introduce bugs and expose vulnerabilities, which leads to security and reliability threads across the infrastructure.

Existing security and reliability techniques and practices for cloud infrastructure code are rudimentary. The main challenge of developing security and reliability techniques for cloud infrastructure code roots in unique characteristics and requirements. Cloud infrastructure code is dynamic and heterogeneous, involving various scripting languages. Many of these scripting languages are known to be hard to analyze using traditional compiler and program analysis techniques. Analyzing security and reliability, as the high level properties of cloud infrastructure, has to go beyond program-level errors, e.g. memory bugs and concurrency bugs, and has to consider infrastructure-level semantics and requirements, e.g. security policies and SLAs.

As shown and described herein, an automation detection tool, computer program product, and method are provided to automated identification of risky patterns in cloud infrastructure scripts. The blueprint describes resources that will be created and their properties, and is both human and machine readable. The blueprint enables a software architect to specify infrastructure parameters without having to write a sequence of programming commands that instruct how to create the resources. Blueprints define one or more resources to be created and define relationships and dependencies between specified resources. A blueprint dependency can be implicitly inferred or explicitly defined. Explicitly defined dependencies between resources ensure that the dependencies are created in the correct order and each resource is uniquely named in the blueprint. Each named resource in the blueprint has its property values explicitly set to a value, or implicitly set via a reference to a property from a different named resource in the blueprint or via a reference to an input parameter to the blueprint.

Blueprint dependencies can be nested, thereby enabling decomposition of deployment. Decomposition of the nesting is beneficial with respect to readability, re-use, and testing. Parameters in the nesting can be passed from a main blueprint to one or more nested blueprints. The nested blueprint can pass an output variable back to the main blueprint, which enables data exchange between blueprints.

Orchestration refers to management of interconnections and interactions among workloads and infrastructure. The orchestration engine creates, configures, and instantiates computational resources, such as infrastructure, virtual machines, middleware, etc. In an embodiment, the orchestration engine interprets blueprints and uses them as patterns for cloud resources. Accordingly, the orchestration leverages blueprints to declare resources and compose solutions.

Blueprint pre-requisites are logic-based dependencies and may include external requirements that are defined outside of the blueprint, and internal requirements that are defined within the blueprint. A blueprint pre-requisite is a requirement, but not a necessity. Blueprint dependencies are notations that allow a user to define which other resources must be satisfied before the next resource can begin. By their very nature, the next resource cannot be satisfied unless the prior resource upon which the dependency relies has been satisfied. A blueprint may be defined with one or more pre-requites. The orchestration engine deploys resources defined with pre-requisites when defined the pre-requisites as indicated in the blueprint are met.

Static code analysis is the analysis of computer program instructions, e.g. source code, and such analysis is performed without actually executing the source code. Dynamic code analysis is the analysis performed on computer program instructions while the source code is executing. Static analysis is considered in the art to provide better source code coverage than dynamic analysis. However, static analysis may not be as accurate as dynamic analysis since static analysis cannot access runtime information. In an embodiment, the static code analysis is performed by an automated tool, as opposed to human analysis. Existing tools for static code analysis highlight possible coding errors (e.g., the lint tool is used for style checking, unused variables, unreachable code, missing initialization) and locate potentially vulnerable source code, thus helping to find and fix defects early in development lifecycle. Code analysis tools are often integrated into a development process, i.e. continuous integration continuous development (CI/CD) pipeline, such that when code is checked in and a pull request is created, the tool is executed and prevents automatic merge to a master branch in case one or more problems in the source code are detected.

Polyglot programming is referred to as practice of writing code in multiple languages to capture additional functionality and efficiency not available in a single language. It has become a common practice to leverage or augment existing code for enterprise application development and management. The use and implementation of polygot programming puts a burden on requiring additional higher skilled resources for training, testing and maintenance because it increases complexity directed at identification of code. The increased burden from polygot programming can degrade application performance or put infrastructure into a vulnerable state. Source code that can degrade application performance or has the potential to put the infrastructure into a vulnerable state is referred to as risky code. In an embodiment, risky code is source code that has an increased likelihood of becoming fault prone, difficult to manage, or difficult to maintain. Deployment experts know their infrastructure and service level requirements, however translating those requirements into complex relationships such that resources are realized when they are required increases the likelihood of presence of risky code.

Provided herein, is a system, computer program product, and method to identify risky code and selectively applying a modification to a corresponding codified infrastructure to mitigate source code defects. Referring to FIG. 1, a computer system (100) is provided with tools to support risk evaluation and modification of an executable codified infrastructure. As shown, a server (110) is provided in communication with a plurality of computing devices (180), (182), (184), (186), (188), and (190) across a network connection (105). The server (110) is configured with a processing unit (112) operatively coupled to memory (114) across a bus (116). A tool in the form of an artificial intelligence (AI) platform (150) is shown local to the server (110), and operatively coupled to the processing unit (112) and memory (114). As shown, the AI platform (150) contains one or more tools in the form of an identification manager (152), a risk manager (154), a modifier (156), and a graph manager (158). Together, the tools provide risk evaluation and codified infrastructure modification over the network (105) from one or more computing devices (180), (182), (184), (186), (188), and (190). The computing devices (180), (182), (184), (186), (188), and (190) communicate with each other and with other devices or components via one or more wires and/or wireless data communication links, where each communication link may comprise one or more of wires, routers, switches, transmitters, receivers, or the like. In this networked arrangement, the server (110) and the network connection (105) enable risk evaluation and modification management across distributed resources. Other embodiments of the server (110) may be used with components, systems, sub-systems, and/or devices other than those that are depicted herein.

The tools, including the AI platform (150), or in one embodiment, the tools embedded therein including the identification manager (152), the risk manager (154), the monitor (156), and the graph manager (158) may be configured to receive input from various sources, including but not limited to input from the network (105), and an operatively coupled knowledge base (160). In one embodiment, the knowledge base (160) includes a first library (162) of existing ML models, shown herein by way of example as $model_A$ ($164_A$), $model_B$ ($164_B$), and $model_N$ ($164_N$). The quantity of ML models in the first library (162) is for illustrative purposes and should not be considered limiting. Each ML model may also have corresponding feedback containing results and determinations made by the ML model. In an embodiment, one or more ML models may not have a corresponding feedback, but once created, the feedback is associated with a corresponding ML model. As shown herein, $model_A$ ($164_A$) has corresponding $feedback_A$ ($166_A$), $model_B$ ($164_B$) has corresponding $feedback_B$ ($166_B$), and $model_N$ ($164_N$) has corresponding $feedback_N$ ($166_N$).

As further shown, the knowledge base (160) includes a second library (170) of generated snippets, shown herein by way of example as $snippet_A$ ($172_A$), $snippet_B$ ($172_B$), and $snippet_N$ ($172_N$). A snippet is a combined selection of non-native code instructions in the same code language which requires the same program. Native code is the source code received in a language suitable for representing the blueprint for execution by a provided infrastructure as code tool. Non-native code is written in a different language than the native code and requires another program or code tool to run or manage the non-native code. The process for generating snippets is discussed below and in FIG. 4. Each snippet may also contain or be associated with a control flow graph, also referred to as a graph. As shown herein $snippet_A$ ($172_A$) has an associated $graph_A$ ($174_A$), $snippet_B$ ($172_B$) has an associated $graph_B$ ($174_B$), and $snippet_N$ ($172_N$) has an associated $graph_N$ ($174_N$). A control flow graph is a process oriented directed graph that shows all of the paths that can be traversed during program execution. Each node of the graph represents non-native program code and each edge represents the path between two nodes. The quantity of snippets in the second library (170) and the quantity of control flow graphs associated with the corresponding snippet(s) is for illustrative purposes and should not be considered limiting.

The various computing devices (180), (182), (184), (186), (188), and (190) in communication with the network (105) demonstrate access points for codified infrastructures and risk evaluation tools. Some of the computing devices may include devices for use by the AI platform (150), and in one embodiment the tools (152), (154), (156), and (158) to support identification of risky code and selective modification of the codified infrastructure to mitigate source code defects. The network (105) may include local network connections and remote connections in various embodiments, such that the AI platform (150) and the embedded tools (152), (154), (156), and (158) may operate in environments of any size, including local and global, e.g. the Internet. Accordingly, the server (110) and the AI platform (150) serve as a front-end system, with the knowledge base (160) and one or more of the ML models(s) ($164_A$)-($164_N$) serving as the back-end system.

As described in detail below, the server (110) and the AI platform (150) identify and modify risky source code represented in the codified infrastructure, e.g. blueprint. The AI platform (150) utilizes the identification manager (152) to receive the executable codified infrastructure, with the codified infrastructure representing one or more sections of source code. It is understood in the art that the codified infrastructure may include or represent native code, or in an embodiment both native and non-native code. The non-native code may in turn include other non-native code and may also include other native code. The identification manager (152) performs an analysis on the codified infrastructure to identify non-native program instructions, if any. The identification manager (152) further functions to identify one or more non-native instruction tools to support a risk evaluation of any correspondingly identified non-native code. The identification of the non-native instruction tools is done using static analysis of the input source code. Each identified non-native instruction tool is configured to highlight or otherwise identify possible coding errors and locate potentially vulnerable code within the non-native code. Accordingly, the identification manager (152) receives the executable codified infrastructure, and identifies non-native program code, if any, and one or more non-native instruction tools to support risk evaluation of the identified non-native program code.

The risk manager (154), which is shown herein operatively coupled to the identification manager (152), functions within the AI platform (150) to combine a selection of the identified non-native program instructions and subject the combined non-native program instructions to a risk evaluation using the one or more non-native instruction tools identified by the identification manager (152). More specifically, the risk manager (154) functions to create one or more snippets, i.e. $snippet_A$ ($172_A$), of the identified non-native program instructions for risk evaluation. Different program languages or tools may employ different processes or protocols for creating snippets. For example, snippets are sequences of non-native instructions created by sequentially appending the instructions, combining the instructions on the same line but separated by a symbol, separating the instructions on adjacent lines, etc. Upon the completion of the risk evaluation, the risk manager (154) maps risk evaluation results to the associated non-native program instructions within the codified infrastructure. Furthermore, the risk manager (154) assigns a risk identifier corresponding to the mapped non-native program instructions. The risk identifier is a characteristic corresponding to a severity of the received results from the risk evaluation. The results identify defects, also called issues or phenomena that present risk. Severity is defined as a degree of impact that a detected defect has on operation or functionality of the source code and indicates the level of attention called for by the defect. Accordingly, the risk manager (154) combines the identified non-native program instructions into snippets, subjects the snippets to a risk evaluation by the identified one or more non-native instruction tool(s), and assigns a risk identifier to the evaluated non-native program instructions.

The risk manager (154) further functions to leverage the one or more ML models ($164_A$)-($164_N$) to calibrate severity associated with the risk identifier assigned to the non-native program instructions from the risk evaluation. Different non-native instruction tools may return different severity levels for detected defects in the non-native code. Each of the ML model(s) ($164_A$)-($164_N$), as shown and described herein, is trained to recognize a corresponding severity rating, or risk level, associated with the returned risk evaluation(s). Accordingly, the risk manager (154) leverages one or more ML model(s) ($164_A$)-($164_N$) to assign a calibrated severity level to the non-native program instructions.

The modifier (156), which is shown herein operatively coupled to the identification manager (152) and the risk manager (154), functions to selectively apply one or more modifications to the codified infrastructure in correspondence with the risk identifier to mitigate any defects in the source code. The modifier (156) further functions to integrate the assigned severity and confidence as feedback ($168_A$)-($168_N$) within the CI/CD pipeline for further learning by the ML models ($164_A$)-($164_N$), respectively. The confidence identifier is an indication of the accuracy of the severity level assigned by the ML model. For example, if the ML model has been trained to recognize the risk evaluation output from the target tool(s), the confidence identifier will be high, and if the ML model does not recognize the risk evaluation output from the target tool(s), then confidence will be low. The feedback ($168_A$)-($168_N$) shown herein by way of example is utilized to further train or subject the corresponding ML models ($164_A$)-($164_N$), respectively, to training. Accordingly, the modifier (156) integrates the assigned severity and confidence as feedback ($168_A$)-($168_N$) within the CI/CD pipeline for further learning by the ML models ($164_A$)-($164_N$).

As further shown, the graph manager (158) is operatively coupled to the identification manager (152), the risk manager (154), and the monitor (156). The graph manager (158) functions to construct a control flow graph of the identified non-native program instructions, shown herein as ($174_A$)-$174_N$). Each node in the constructed control flow graph ($174_A$)-$174_N$) represents non-native program code and each directed edge in the constructed flow graph represents a path between two nodes. The graph manager (158) functions to traverse the constructed flow graph ($174_A$)-$174_N$) and assign a confidence level to each node represented in the graph, hereinafter referred to as a node confidence level, based on a node characteristic. In an embodiment, the node confidence level is associated with a frequency characteristic which indicates the frequency the non-native program code represented or assigned to the node is accessed during traversal of the control flow graph. Accordingly, the graph manager (158) constructs and traverses one or more control flow graphs ($174_A$)-$174_N$) of the identified non-native program instructions.

Though shown as being embodied in or integrated with the server (110), the AI platform (150) may be implemented in a separate computing system (e.g., 190) that is connected across the network (105) to the server (110). Similarly, although shown local to the server (110), the tools (152), (154), (156), and (158) may be collectively or individually distributed across the network (105). Wherever embodied, the identification manager (152), risk manager (154), modifier (156) and graph manager (158) are utilized to manage and support risk evaluation and modification of an executable codified infrastructure.

Codified infrastructures, i.e. blueprints, may be communicated to the server (110) across the network (105). For example, in one embodiment, one or more codified infrastructures may be communicated to the server (110) from nonvolatile data store ($190_A$). The identification manager (152) processes the codified infrastructure(s), whether received from the knowledge base (160) or across the network (105).

Types of information handling systems that can utilize server (110) range from small handheld devices, such as a handheld computer/mobile telephone (180) to large mainframe systems, such as a mainframe computer (182). Examples of a handheld computer (180) include personal digital assistants (PDAs), personal entertainment devices, such as MP4 players, portable televisions, and compact disc players. Other examples of information handling systems include a pen or tablet computer (184), a laptop or notebook computer (186), a personal computer system (188) and a server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190$_A$), and mainframe computer (182) utilizes nonvolatile data store (182$_A$). The nonvolatile data store (182$_A$) can be a component that is external to the various information handling systems or can be internal to one of the information handling systems.

An information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
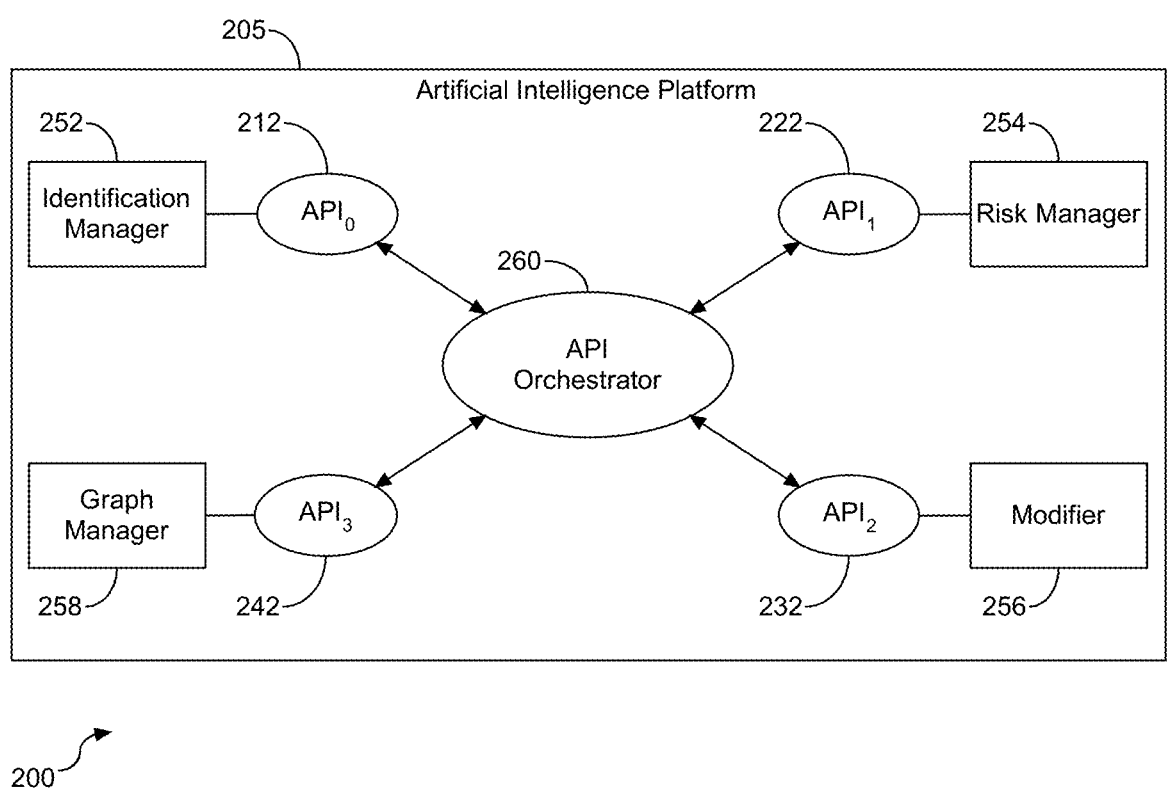
FIG. 2 depicts a block diagram a block diagram is provided illustrating the tools shown in FIG. 1 and their associated APIs.

An Application Program Interface (API) is understood in the art as a software intermediary between two or more applications. With respect to the risk evaluation and modification of an executable codified infrastructure shown and described in FIG. 1, one or more APIs may be utilized to support one or more of the AI platform tools, including the identification manager (152), the risk manager (154), the modifier (156), and the graph manager (158), and their associated functionality. Referring to FIG. 2, a block diagram (200) is provided illustrating the AI platform tools and their associated APIs. As shown, a plurality of tools are embedded within the AI platform (205), with the tools including the identification manager (252) associated with API$_0$ (212), the risk manager (254) associated with API$_1$ (222), the modifier (256) associated with API$_2$ (232), and the graph manager (258) associated with API$_3$ (242). Each of the APIs may be implemented in one or more languages and interface specifications.

API$_0$ (212) provides support for receipt of the codified infrastructure, identification of non-native program instructions within the codified infrastructure, and identification of non-native instruction tools to support risk evaluation. API$_1$ (222) provides support for combining the identified non-native program instructions, subjecting the combined instructions to a risk evaluation, mapping the risk evaluation results to the codified infrastructure, and assigning the risk identifier to the mapped results in the codified infrastructure. API$_2$ (232) provides support for selectively modifying the codified infrastructure in correspondence with the risk identifier to mitigate any defects in the source code. API$_2$ (232) further provides support to integrate the assigned severity and confidence as feedback (168$_A$)-(168$_N$) within the CI/CD pipeline for further learning by the ML models (164$_A$)-(164$_N$), respectively. API$_3$ (242) provides support for constructing a control flow graph of the identified non-native program instructions, traversing the constructed graph to identify a node characteristic, and assigning a confidence level to each node represented in the graph based on the node characteristic(s). As shown, each of the APIs (212), (222), (232), and (242) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3A:
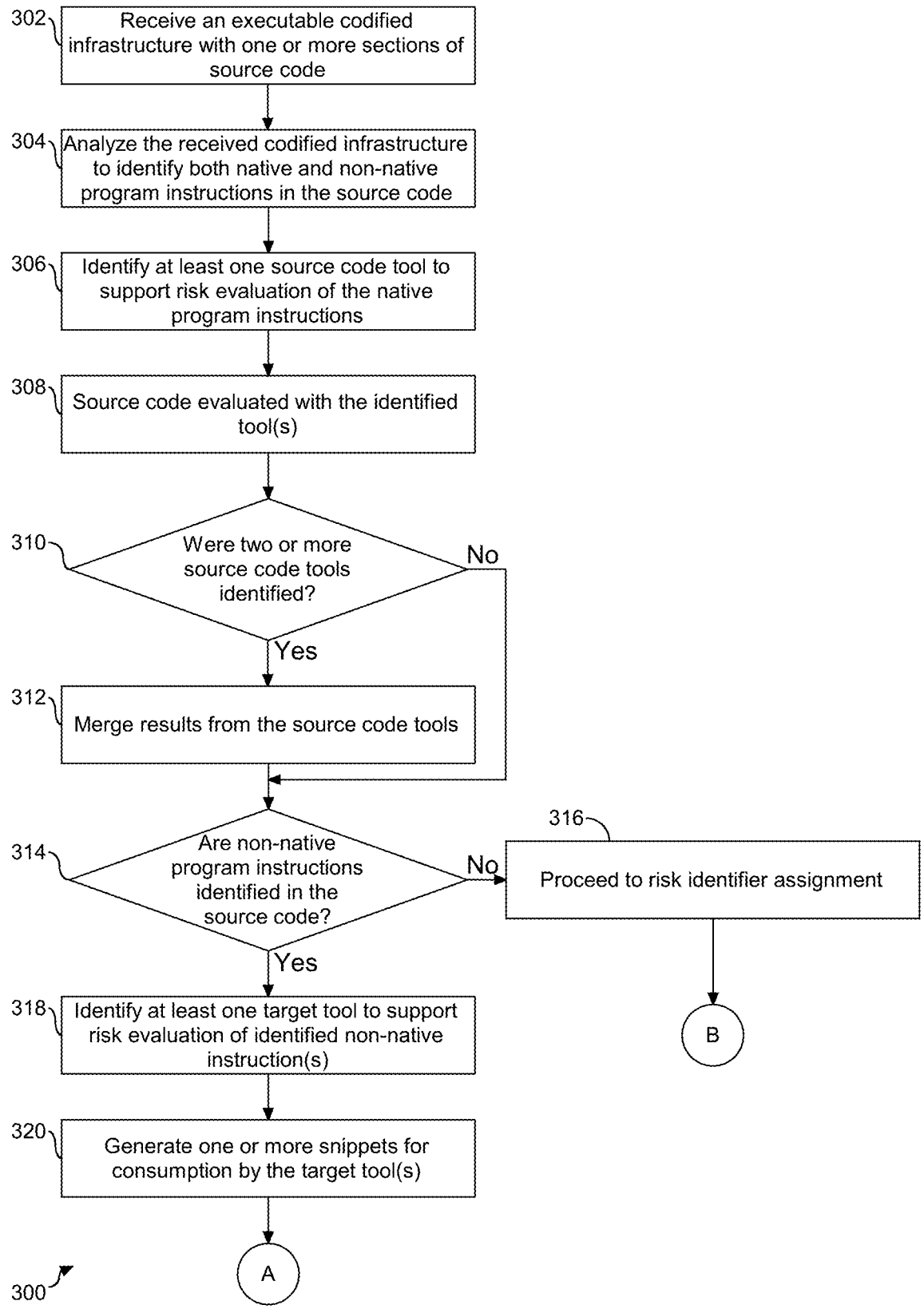
FIGS. 3A and 3B depict a flow chart to illustrate a process for selectively modifying a codified infrastructure to mitigate one or more source code defects.
Figure 3B:
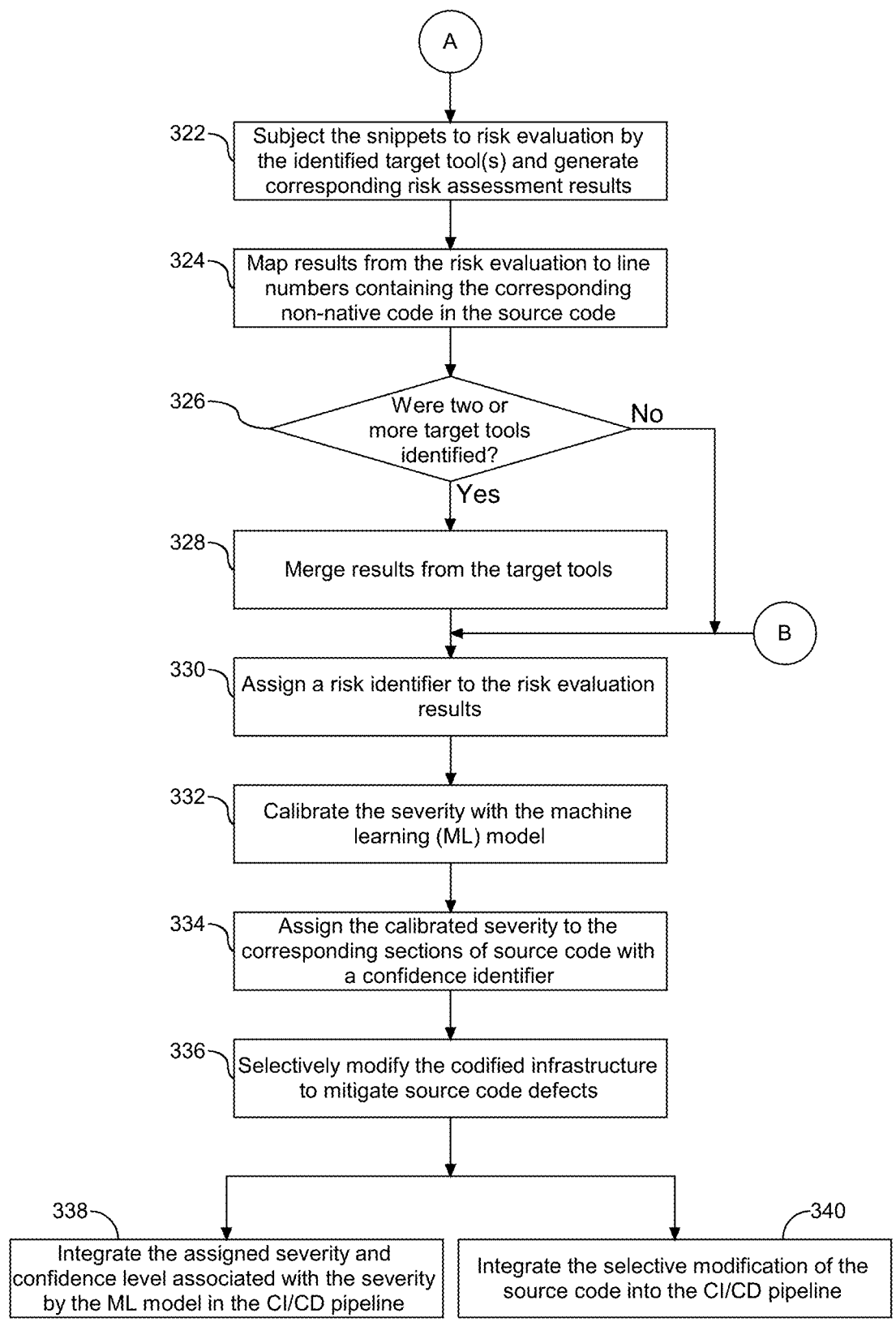

Referring to FIGS. 3A and 3B, a flow chart (300) is provided illustrating a process for selectively modifying a codified infrastructure to mitigate one or more source code defects. A mixed program uses program code that is both native and non-native. As shown, an executable codified infrastructure is received with one or more sections of source code (302). The received codified infrastructure is subject to analysis to identify both native and non-native program instructions in the source code (304). The identification takes place using static analysis of the input source code, where native sections identify the non-native sections. At least one source code tool is identified to support risk evaluation of the native program instructions (306), and the source code is subject to evaluation by the identified tool(s) (308). In an embodiment, a library of risk evaluation tools is maintained for known native and non-native code instructions, and at step (306) one or more of the risk evaluation tools is utilized for the identification. It is then determined if two or more source code tools were identified (310). A positive response to the determination at step (310) is followed by merging the results from the source code tools (312). Following completion of the merging at step (312) or following a negative response to the determination at step (310), an assessment or analysis is conducted to ascertain if non-native program instructions was identified in the source code (314). In an embodiment, at step (314) specific instructions and corresponding tools are identified with keywords and file names invoked from the non-native section(s) identified at step (304). For example, #!/usr/bin/python identifies the shell model being invoked as python code, #!/bin/bash identifies the shell module being invoked at bash script, and subprocess.popen('echo.rb') identifies the target from the file name extension that a "ruby" script is being called from source instructions in python. It is understood in the art that the source code may be limited to native instructions. If at step (314) it is determined that the source code is limited to native instructions, then the process of modifying the codified infrastructure to accommodate any identified non-native instructions concludes and proceeds to assigning risk identifier for results from native risk identification tools (316). However, if at step (314) it is determined that the source code includes non-native instructions then further processing of the codified infrastructure is entailed. If only native instructions are identified then the risk is evaluated against multiple tools and merged to find risk and calibrate severity. When both native and non-native instructions are identified, then the non-native instructions are executed against multiple risk evaluation tools. These tools may in turn be treated as source tools, and recursively identify other non-native instructions. Input for all these native and non-native tools are combined to provide risk for corresponding line numbers. Accordingly, the initial aspect of mitigating source code defects is directed at identification and mitigation of defects in non-native instructions.

At least one target tool is identified to support risk evaluation of identified non-native instruction (318). The identified target tool(s) is an automated tool that is capable of performing static code analysis on the non-native code instructions. In an embodiment, each identified target tool is configured to highlight or otherwise identify possible coding errors and locate potentially vulnerable code within the non-native code instructions, thereby facilitating identification and correction of defects before the coding errors cause a fault or other error in the codified infrastructure. Snippets are referred to as a combined selection of non-native code instructions, which when formed may be subject to risk evaluation by the identified target tools. In an embodiment, each snippet is a combined selection of non-native code instructions in the same language and requires the same program. Following the target tool(s) identification at step (318), one or more snippets are generated for consumption by the target tool(s) (320). The process for generating snippets will be discussed in greater detail in FIG. 4. Accordingly, in response to identification of non-native code instructions in a received codified infrastructure, the non-native code instructions are selectively combined into snippets, and one or more target tools to support risk evaluation of the snippets are also identified so that the snippets can be subject to a risk evaluation.

Following step (320), the snippets are subject to risk evaluation by the identified target tool(s) and corresponding risk assessment results are generated (322). Results from the risk evaluation are mapped to line numbers containing the corresponding non-native code in the source code (324). When there are more tools that provide results, more work is required to remove duplicates and combine the risk level in the identified results. To address a possible work increase, a determination is made if two or more target tools were identified (326) previously at step (318). If the determination is positive, then the results from the two or more target tools are merged (328). More specifically, it is understood that different target tools may return different messages that in an embodiment, these different message may have the same meaning. It is also understood that different target tools may also return different severity levels for detected defects in the non-native code. Severity is defined as a degree of impact that a detected defect has on operation or functionality of the source code and indicates the level of attention called for by the defect. For example, a severity of "1" might indicate a critical defect that requires immediate intervention, while a severity of "4" might indicate an informational message that does not usually require any corrective action. Either following step (328), a negative response to the determination at step (326), or following step (316) a risk identifier is assigned to each of the risk evaluation results (330).

As shown herein, a machine learning (ML) model is employed to assign a risk identifier to defects in the source code. The risk identifier is a characteristic corresponding to a severity of the received results from the risk evaluation. Severity is defined as a degree of impact that a detected defect has on operation or functionality of the source code and indicates the level of attention called for by the defect. The risk identifier encompasses a confidence associated with the assigned severity. The ML model as shown and described herein is trained to recognize the corresponding severity associated with the returned risk evaluations from the target tool(s). Different target tools may return different severity levels for the same detected defect in the non-native code. The ML model subjects the returned severity to calibration based on trained knowledge to provide a uniform and consistent severity across the different target tools (332).

The calibrated severity as determined by the ML model is assigned to the corresponding sections of source code along with a confidence identifier (334). The confidence identifier is an indication of the accuracy of the severity level assigned by the ML model. If the ML model has been trained to recognize the risk evaluation output from the target tool(s), the confidence identifier will be high. If the ML model does not recognize the risk evaluation output from the target tool(s), then confidence will be low. The codified infrastructure is selectively modified to mitigate source code defects based on the assigned severity and confidence identifiers (336). The assigned severity and the confidence level associated with the severity by the ML model are integrated in the CI/CD pipeline for feedback and to further train the ML model (338). Rules for source and target risk identification tools are customized to affect a change in the severity output by the tools based on the feedback. Concurrent to step (338), the selective modification of the source code is integrated into the CI/CD pipeline for deployment in the codified infrastructure (340). Accordingly, the ML model assigns a severity and confidence level to defects in the source code and a modification is applied to the codified infrastructure to mitigate source code defects.

Figure 4:
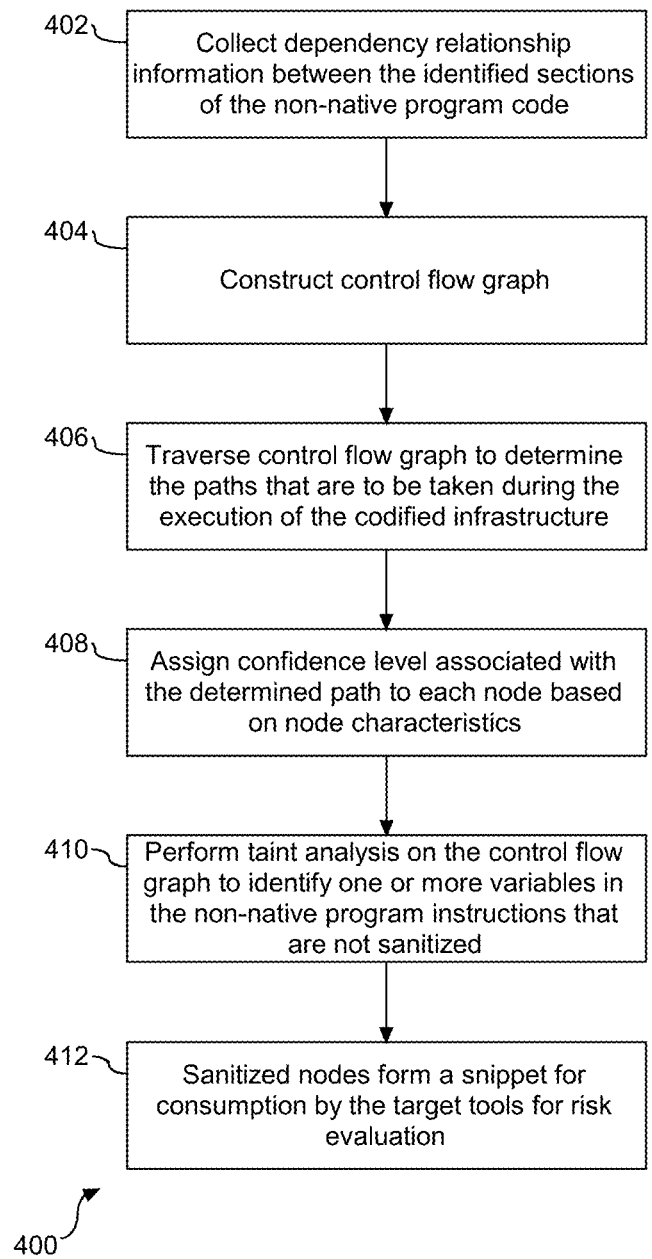
FIG. 4 depicts a flow chart to illustrate a process for evaluation of non-native program instructions.

Referring to FIG. 4, a flow chart (400) is provided to illustrate a process for evaluation of non-native program instructions. A data flow analysis is conducted to collect dependency relationship information between the identified sections of the non-native program code (402). Data flow analysis is used to collect dynamic run-time information about data in the software while it is in a static state. The data flow analysis incorporates a dynamic analysis of the codified infrastructure in conjunction with the static analysis being performed by the target tools in FIG. 3. Based on the collected dependency relationships, a control flow graph is constructed (404). A control flow graph is a process oriented directed graph that shows all of the paths that can be traversed during a program. Each node of the graph represents non-native program code and each edge represents the path between two nodes.

Following the construction of the control flow graph, the control flow graph is traversed to determine the paths that are to be taken during the execution of the codified infrastructure (406) and a confidence level associated with the determined path is assigned to each node based on node characteristics (408). The confidence level from step (408) is not to be confused with the confidence identifier from FIG. 3 which functions to identify a confidence associated with calibrated severity from the ML model. In an embodiment, the confidence level corresponding to the path is associated with a frequency characteristic which indicates the frequency the non-native program code represented or assigned to the node is accessed during traversal of the control flow graph. A taint analysis is then performed on the control flow graph to identify one or more variables in the non-native program instructions that are not sanitized, with the taint analysis finding variables that need to be evaluated with different input values (410). Sanitization is a process of fixing a variable or instruction that can cause a problem, such as a variable or instruction previously determined to contain malicious code. Sanitizing removes illegal characters from the data. Depending on the context, sanitization may take on different forms, and can be as simple as removing vulgarities and odd symbols from text to removing SQL injection attempts and other malicious code intrusion attempts. For example, a passed parameter may be empty, null, or contain unexpected characters, resulting in unexpected behavior by the non-native instructions. The taint analysis performed at step (410) identifies variables that are untrustworthy when they flow from native program instructions or other non-native program instructions or are derived from such variables along the vulnerable execution paths. If the source of the value of a variable is untrustworthy, the variable is considered tainted. The taint analysis allows tracking of influence of the tainted variable along execution of the program. As shown and described in FIG. 1, snippets are sequences of non-native instructions created by sequentially appending the instructions, combining the instructions on the same line but separated by a symbol, separating the instructions on adjacent lines, etc. Following step (410), snippets are generated for consumption by the target tools for risk evaluation (412). More specifically, at step (412) one or more tainted variables are assigned different values and are run against the target tools to ascertain the risk corresponding to the snippets. Accordingly, the taint analysis is performed on the control flow graph to identify what needs to be fixed in the instructions, with the snippets formed for consumption by the target tools for risk evaluation.

Embodiments shown and described herein may be in the form of a computer system for use with an AI platform for providing and machine learning directed at a codified infrastructure of a cloud application. Aspects of the tools (152), (154), (156), and (158) and their associated functionality may be embodied in a computer system/server in a single location, or in an embodiment, may be configured in a cloud based system sharing computing resources. With references to FIG. 5, a block diagram (500) is provided illustrating an example of a computer system/server (502), hereinafter referred to as a host (502) in communication with a cloud based support system, to implement the system and processes described above with respect to FIGS. 1-4. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments (510) where tasks are performed by remote processing devices that are linked through a communications network. In a distributed cloud computing environment, program modules may be located in both local and remote computer system storage media including memory storage devices.

Figure 5:
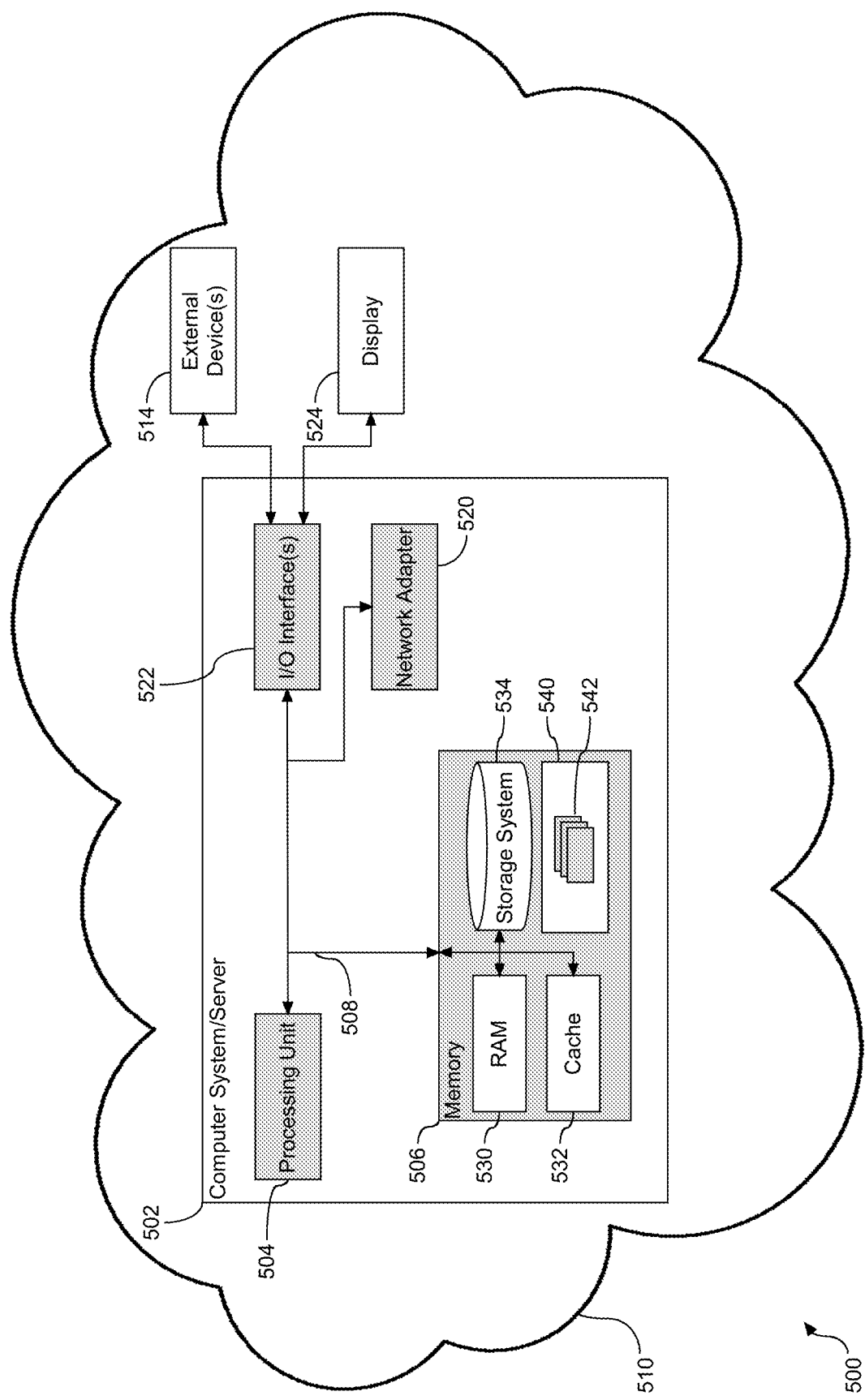
FIG. 5 is a block diagram depicting an example of a computer system/server of a cloud based support system, to implement the system and processes described above with respect to FIGS. 1-4.

As shown in FIG. 5, host (502) is shown in the form of a general-purpose computing device. The components of host (502) may include, but are not limited to, one or more processors or processing units (504), a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (530) and/or cache memory (532). By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (540), having a set (at least one) of program modules (542), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments of the adversarial training and dynamic classification model evolution. For example, the set of program modules (542) may include the modules configured as the tools (152), (154), (156), and (158) described in FIG. 1.

Host (502) may also communicate with one or more external devices (514), such as a keyboard, a pointing device, a sensory input device, a sensory output device, etc.; a display (524); one or more devices that enable a user to interact with host (502); and/or any devices (e.g., network card, modem, etc.) that enable host (502) to communicate with one or more other computing devices. Such communication can occur via Input/Output (I/O) interface(s) (522). Still yet, host (502) can communicate with one or more networks such as a local area network (LAN), a general wide area network (WAN), and/or a public network (e.g., the Internet) via network adapter (520). As depicted, network adapter (520) communicates with the other components of host (502) via bus (508). In one embodiment, a plurality of nodes of a distributed file system (not shown) is in communication with the host (502) via the I/O interface (522) or via the network adapter (520). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (530), cache (532), and storage system (534), such as a removable storage drive and a hard disk installed in a hard disk drive.

Computer programs (also called computer control logic) are stored in memory (506). Computer programs may also be received via a communication interface, such as network adapter (520). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

In one embodiment, host (502) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
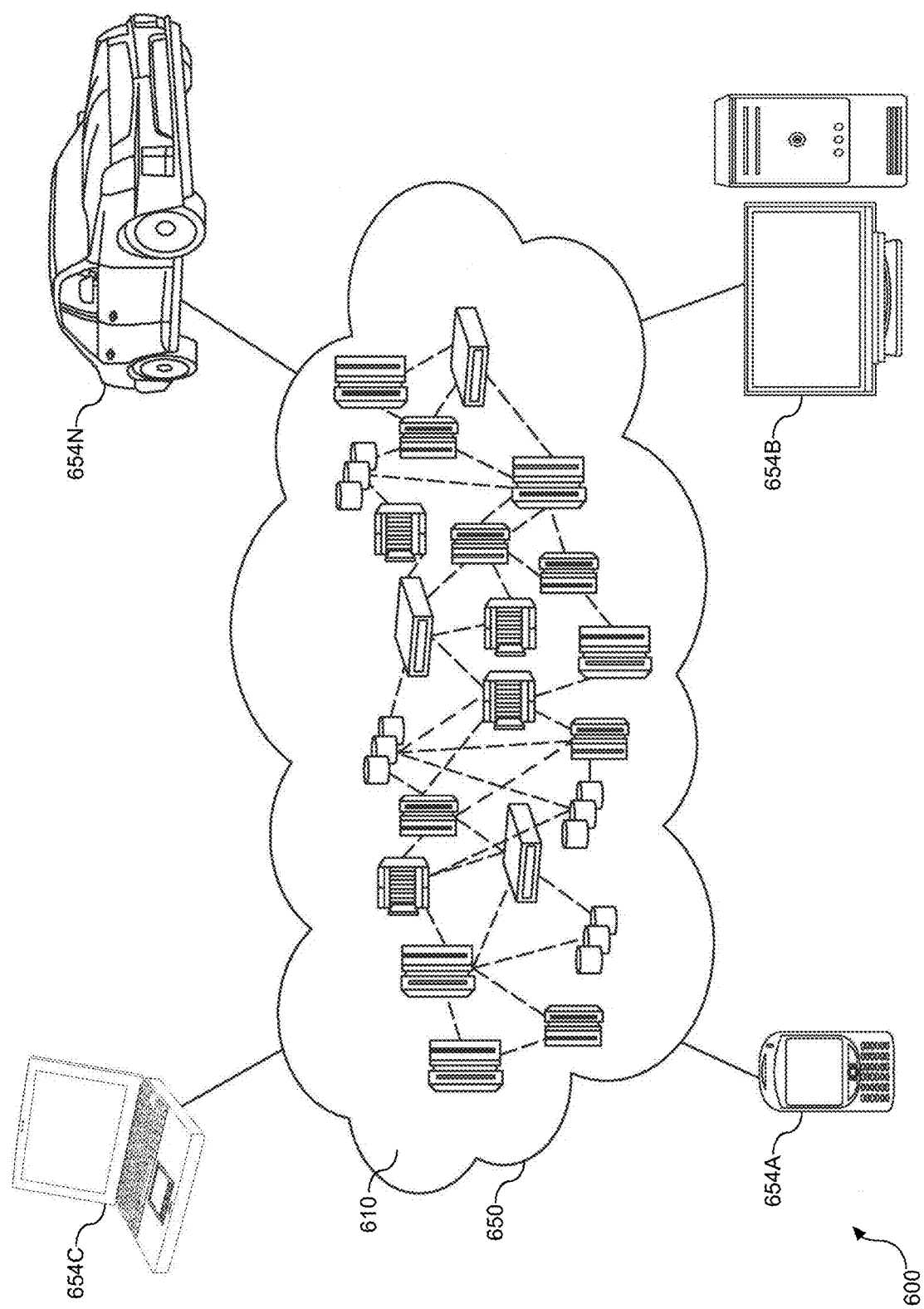
FIG. 6 depicts a block diagram illustrating a cloud computer environment.

Referring now to FIG. 6, an illustrative cloud computing network (600). As shown, cloud computing network (600) includes a cloud computing environment (650) having one or more cloud computing nodes (610) with which local computing devices used by cloud consumers may communicate. Examples of these local computing devices include, but are not limited to, personal digital assistant (PDA) or cellular telephone (654A), desktop computer (654B), laptop computer (654C), and/or automobile computer system (654N). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (654A-N) shown in FIG. 6 are intended to be illustrative only and that the cloud computing environment (650) can communicate with any type of computerized device over any type of network and/or network addressable connection (e.g., using a web browser).

Figure 7:
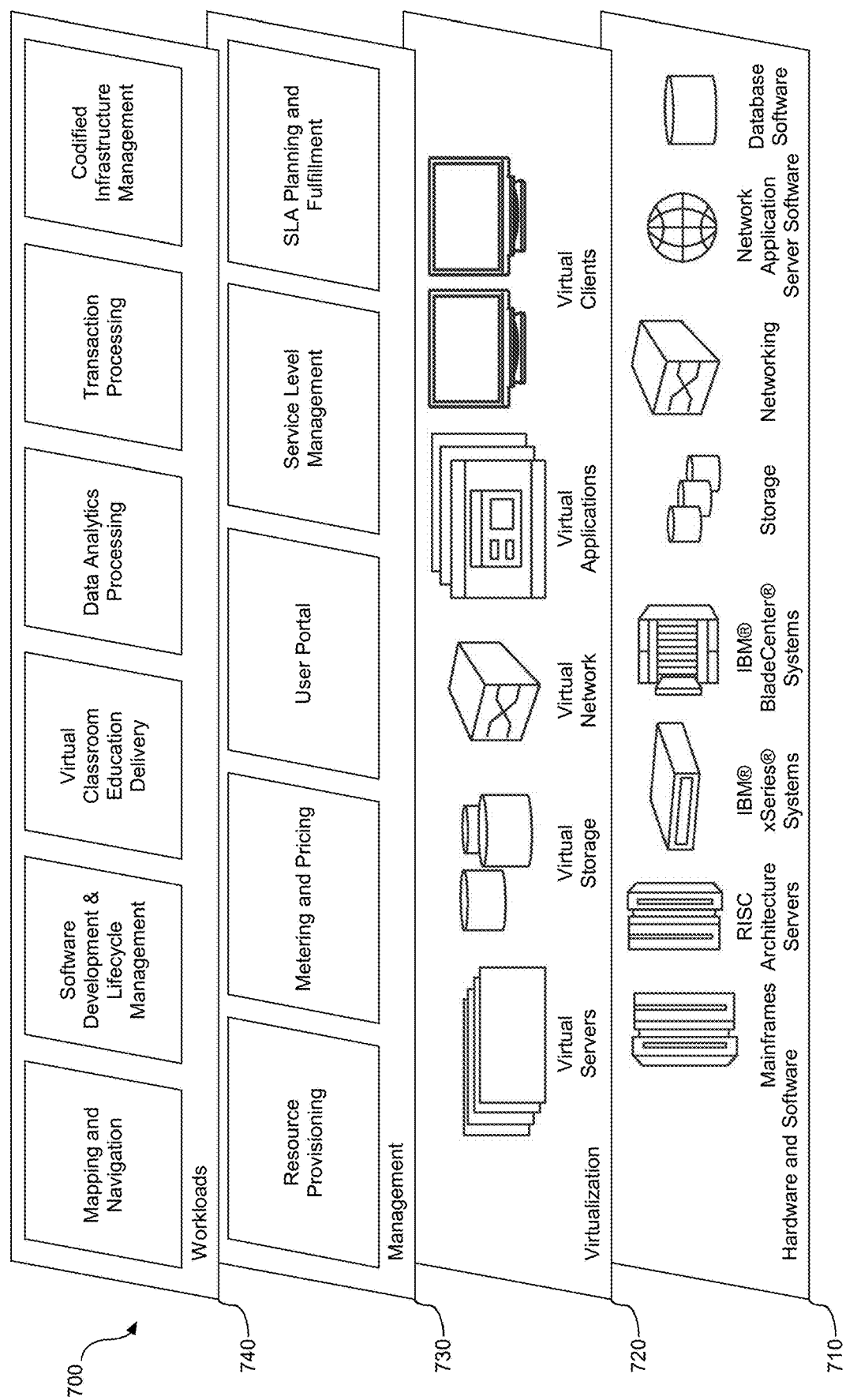
FIG. 7 depicts a block diagram illustrating a set of functional abstraction model layers provided by the cloud computing environment.

Referring now to FIG. 7, a set of functional abstraction layers (700) provided by the cloud computing network of FIG. 6 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740). The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and codified infrastructure risk evaluation and modification.

The system and flow charts shown herein may also be in the form of a computer program device for dynamically orchestrating a pre-requisite driven codified infrastructure. The device has program code embodied therewith. The program code is executable by a processing unit to support the described functionality.

While particular embodiments have been shown and described, it will be obvious to those skilled in the art that, based upon the teachings herein, changes and modifications may be made without departing from its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiment(s) may be a system, a method, and/or a computer program product. In addition, selected aspects of the present embodiment(s) may take the form of an entirely hardware embodiment, an entirely software embodiment (including firmware, resident software, microcode, etc.) or an embodiment combining software and/or hardware aspects that may all generally be referred to herein as a "circuit," "module" or "system." Furthermore, aspects of the present embodiment(s) may take the form of computer program product embodied in a computer readable storage medium (or media) having computer readable program instructions thereon for causing a processor to carry out aspects of the present embodiment(s). Thus embodied, the disclosed system, a method, and/or a computer program product are operative to improve the functionality and operation of dynamical orchestration of a pre-requisite driven codified infrastructure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiment(s). In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiment(s). In particular, the codified infrastructure, including the dynamic orchestration of a pre-requisite driven codified infrastructure may be carried out by different computing platforms or across multiple devices. Furthermore, the data storage and/or corpus may be localized, remote, or spread across multiple systems. Accordingly, the scope of protection of the embodiment(s) is limited only by the following claims and their equivalents.

What is claimed is:

1. A computer system comprising:
a processing unit operatively coupled to memory;
a knowledge engine operatively coupled to the processing unit, the knowledge engine configured with one or more tools to support risk evaluation and modification of an executable codified infrastructure, the tools comprising:
an identification manager to receive the executable codified infrastructure, the codified infrastructure including one or more sections of source code;
the identification manager to analyze the codified infrastructure, including identify non-native program instructions and one or more non-native instruction tools to support risk evaluation;
a risk manager operatively coupled to the identification manager, the risk manager to:
combine a selection of the identified non-native program instructions and subject the combined selection to a risk evaluation by the identified one or more non-native tools;
map a received result from the risk evaluation to one or more corresponding lines of the identified non-native program instructions in the source code; and
leverage a machine learning (ML) model to assign a risk identifier to the one or more corresponding lines of the identified non-native program instructions in the source code; and
a modifier operatively coupled to the risk manager, the modifier to selectively apply one or more modifications to the codified infrastructure in correspondence with the assigned risk identifier, the applied modification to mitigate defects in the source code.

2. The system of claim 1, further comprising the risk manager to apply the risk identifier to the ML model, the ML model to calibrate severity of the risk identifier and apply the calibrated severity to a risk evaluation of the identified non-native program instructions.

3. The system of claim 2, further comprising the ML model to assign a confidence identifier to the calibrated severity, and the modifier to integrate the calibrated severity and assigned confidence identifier within a continuous integration and continuous deployment (CI/CD) pipeline for feedback and learning.

4. The system of claim 1, further comprising a graph manager operatively coupled to the modifier, the graph manger to conduct a data flow analysis of the non-native program instructions, the analysis including collection of dependency relationship information between sections in the non-native program instructions.

5. The system of claim 4, further comprising the graph manager to:
   construct a control flow graph of the identified non-native program instructions;
   traverse the constructed control flow graph; and
   assign a confidence level to each node represented in the graph based on a node characteristic.

6. The system of claim 4, wherein the risk evaluation by the one or more non-native tools includes a taint analysis to identify one or more variables in the non-native program instructions that are not sanitized.

7. The system of claim 6, wherein the risk evaluation further comprises the risk manager to subject the non-native program instructions to one or more execution runs for identified variables, and evaluate runtime risk.

8. A computer program product to support risk evaluation and modification of an executable codified infrastructure, the computer program product comprising a computer readable storage medium having program code embodied therewith, the program code executable by a processor to:
   receive an executable codified infrastructure, the codified infrastructure including one or more sections of source code,
   analyze the codified infrastructure, including identify non-native program instructions and one or more non-native instruction tools to support risk evaluation;
   combine a selection of the identified non-native program instructions and subject the combined selection to a risk evaluation by the identified one or more non-native tools;
   map a received result from the risk evaluation to one or more corresponding lines of the identified non-native program instructions in the source code;
   leverage a machine learning (ML) model to assign a risk identifier to the one or more corresponding lines of the identified non-native program instructions in the source code; and
   selectively apply one or more modifications to the codified infrastructure in correspondence with the assigned risk identifier, the applied modification to mitigate defects in the source code.

9. The computer program product of claim 8, further comprising the program code to apply the risk identifier to the ML model, the ML model to calibrate severity of the risk identifier and apply the calibrated severity to a risk evaluation of the identified non-native program instructions.

10. The computer program product of claim 9, further comprising the ML model to assign a confidence identifier to the calibrated severity, and the program code to integrate the calibrated severity and assigned confidence identifier within a continuous integration and continuous deployment (CI/CD) pipeline for feedback and learning.

11. The computer program product of claim 8, further comprising the program code to conduct a data flow analysis of the non-native program instructions, the analysis including collection of dependency relationship information between sections in the non-native program instructions.

12. The computer program product of claim 11, further comprising the program code to:
   construct a control flow graph of the identified non-native program instructions;
   traverse the constructed control flow graph; and
   assign a confidence level to each node represented in the graph based on a node characteristic.

13. The computer program product of claim 11, wherein the risk evaluation by the one or more non-native tools includes a taint analysis to identify one or more variables in the non-native program instructions that are not sanitized.

14. The computer program product of claim 13, wherein the risk evaluation further comprises the program code to subject the non-native program instructions to one or more execution runs for identified variables, and evaluating runtime risk.

15. A method for identifying risky programming comprising:
   receiving an executable codified infrastructure, the codified infrastructure including one or more sections of source code,
   analyzing the codified infrastructure, including identifying non-native program instructions and one or more non-native instruction tools to support risk evaluation;
   combining a selection of the identified non-native program instructions and subjecting the combined selection to a risk evaluation by the identified one or more non-native tools;
   mapping a received result from the risk evaluation to one or more corresponding lines of the identified non-native program instructions in the source code;
   leveraging a machine learning (ML) model to assigning a risk identifier to the one or more corresponding lines of the identified non-native program instructions in the source code; and
   selectively applying one or more modifications to the codified infrastructure in correspondence with the assigned risk identifier, the applied modification to mitigate defects in the source code.

16. The method of claim 15, further comprising applying the risk identifier to the ML model, the ML model calibrating severity of the risk identifier and applying the calibrated severity to a risk evaluation of the identified non-native program instructions.

17. The method of claim 16, further comprising the ML model assigning a confidence identifier to the calibrated severity and integrating the calibrated severity and assigned confidence identifier within a continuous integration and continuous deployment (CI/CD) pipeline for feedback and learning.

18. The method of claim 15, further comprising conducting a data flow analysis of the non-native program instructions, the analysis including collection of dependency relationship information between sections in the non-native program instructions.

19. The method of claim 18, further comprising:
   constructing a control flow graph of the identified non-native program instructions;

traversing the constructed control flow graph; and
assigning a confidence level to each node represented in the graph based on a node characteristic.

20. The method of claim 18, wherein the risk evaluation by the one or more non-native tools includes a taint analysis identifying one or more variables in the non-native program instructions that are not sanitized.

* * * * *